United States Patent [19]
Belle et al.

[11] 4,257,866
[45] Mar. 24, 1981

[54] ELECTROLYZER CELL

[75] Inventors: Pierre Belle, Meylan; Jacques Poux, Grenoble, both of France

[73] Assignee: Alsthom-Atlantique, Paris, France

[21] Appl. No.: 89,391

[22] Filed: Oct. 30, 1979

[30] Foreign Application Priority Data

Nov. 10, 1978 [FR] France .................................. 78 31806

[51] Int. Cl.³ .......................... C25B 9/00; C25B 13/00
[52] U.S. Cl. .................................... 204/253; 204/279; 204/267; 204/295
[58] Field of Search ................................ 204/253–258, 204/267–270, 279, 295–296

[56] References Cited

U.S. PATENT DOCUMENTS

| | | | |
|---|---|---|---|
| 1,272,397 | 7/1918 | Dohmen | 204/256 |
| 1,464,840 | 8/1923 | Allan | 204/256 |
| 4,026,782 | 5/1977 | Bouy et al. | 204/79 X |
| 4,175,025 | 11/1979 | Creamer et al. | 204/279 X |

FOREIGN PATENT DOCUMENTS

139296  3/1920  United Kingdom .

*Primary Examiner*—G. L. Kaplan
*Assistant Examiner*—D. R. Valentine
*Attorney, Agent, or Firm*—Kenyon & Kenyon

[57] ABSTRACT

An electrolyzer cell is made up of a pair of electrodes (1,1') separated by a diaphragm (2). The diaphragm is sandwiched between a pair of frames (3,3') and generally includes its own frame (4). It is difficult to make frames sufficiently accurately for large cells (e.g. up to 2 m²). using conventional techniques of cutting the frame out from a sheet of material or by one-piece moulding. The present invention uses assembly of elongate frame components. Preferably they are joined together using dovetail joints (31,41), which ensure adequate sealing, and with the dovetails shifted from one frame to the next to ensure a more uniform pressing effect.

9 Claims, 3 Drawing Figures

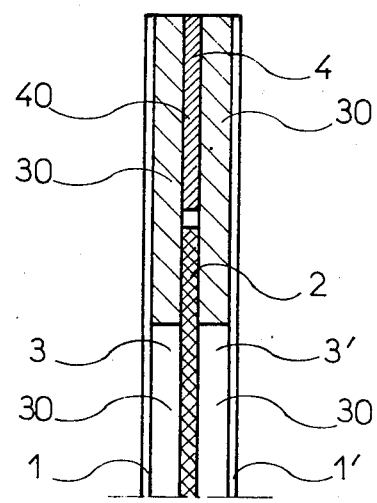
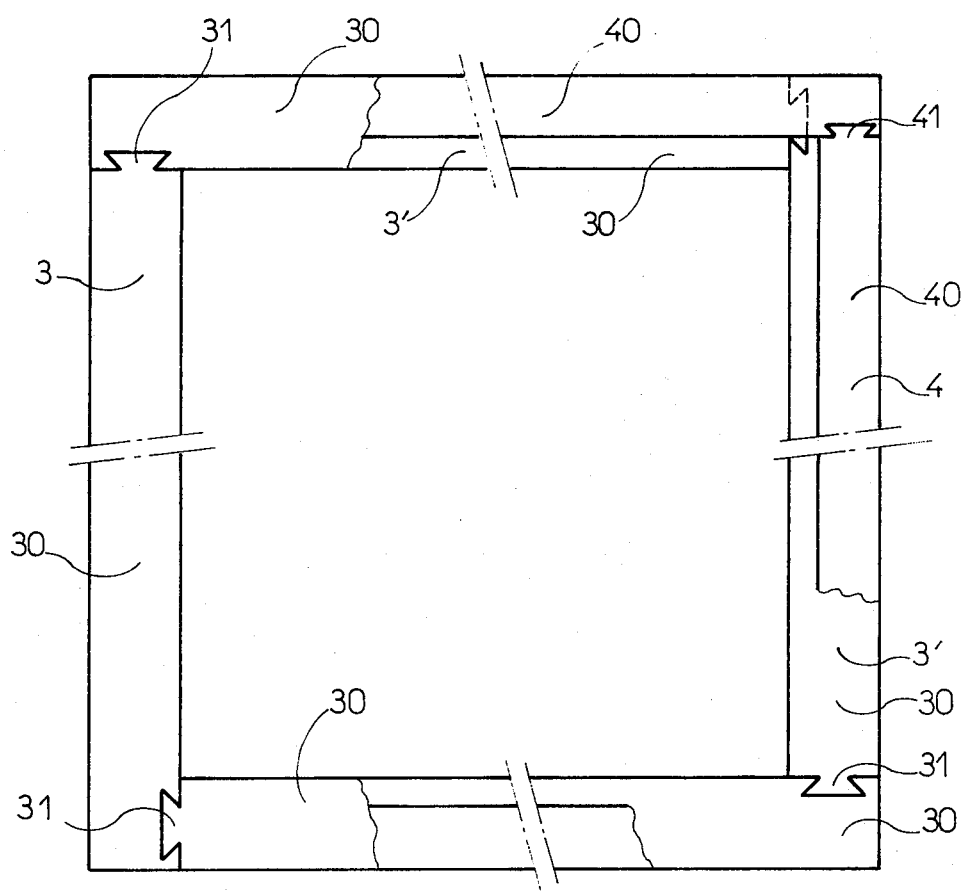

ELECTROLYZER CELL

The invention relates to an electrolyser cell and, more particularly, to the filter-press type, such as a water electrolyser. A filter-press type electrolyser is constituted by a plurality of cells disposed in series with one another and clamped together by tie rods. In each cell, the active components are held together by parts called frames whose main function is to provide:

the mechanical strength and insulation required for series connecting the cells which constitute the electrolysis module; and the sealing of the electrolyte solution between the anode and cathode chambers, as well as between these chambers and the outside; usually, therefore, the frames must withstand the pressure of the electrolyte.

To meet these requirements, the connecting frames must be made at least partially of an elastic or elastoplastic material which provides simultaneously mechanical strength, electric insulation and sealing. To these qualities must be added resistance to chemical attack by the liquid electrolyte and the electrolysis products.

Industrially manufactured high-power electrolysers of the filter-press type necessarily juxtapose a plurality of identical cells each of which has a large active area of up to two square meters.

Further, each of these frames is formed in a single part which can be produced either by cutting out from a sheet of suitable material or by an appropriate method of moulding such material or by an appropriate method of moulding such material.

It is therefore evident that mass-producing such types of large one-piece frames, which are usually not very thick, is difficult, especially due to high wastage from trimmings in the case of cutting out, tooling investment needed, and manufacture and handling problems. These factors lead to a high rejection rate, taking into account the required tolerances, and hence to excessive cost.

Preferred embodiments of the present invention provide an electrolyser cell having frames in which these drawbacks are reduced.

The invention provides a filter-press type of electrolyser cell comprising a pair of electrodes separated by a diaphragm, said diaphragm being sandwiched between a pair of fluid-tight insulating frames which are constituted by assembling elongate components fitted together by joints.

Preferably said components of said frames include means which are fitted together; these means can be constituted by dovetail joints. The line of join of one frame is shifted with respect to that of the frames adjacent to it. The frame components are made of insulating material, e.g. of the elasto-plastic type.

The shape of the cells may be substantially square. Such a cell can advantageously be disposed inside a pressurization chamber which contains the set of cells of an electrolyser.

An embodiment of the invention is described by way of example and with reference to the accompanying drawings, in which:

FIG. 2 is a schematic partially cutaway profile view of the cell of an electrolyser in accordance with the invention; and FIG. 3 is a schematic front view of a cell in accordance with the nvention.

Figure 1:
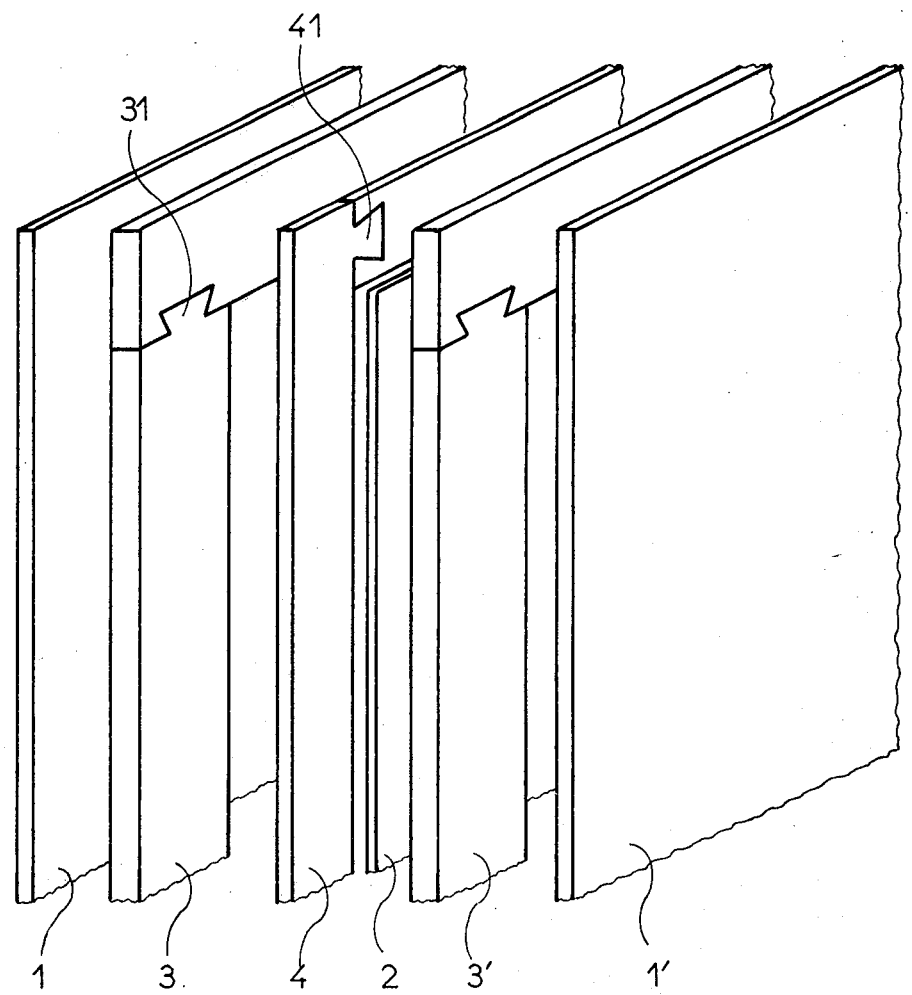
FIG. 1 is a partial schematic exploded perspective view of a cell in accordance with the invention.

FIGS. 1 and 2 show a corner portion of a square electrolyser cell which includes a central diaphragm 2 between two electrodes 1 and 1' and spaced apart therefrom by fluid-tight insulating frames 3 and 3' which are disposed between the periphery of the electrodes and of the diaphragm. The electrodes 1 and 1' are common to the adjacent cells, not shown, with which they are connected in series.

An intermediate frame 4 is disposed around the diaphragm 2 and between the frames 3 and 3'.

Each frame 3, 3' or 4 is constituted by assembling components 30 or 40, respectively, such that their longitudinal ends are disposed against the lateral edge of the adjacent components so that a square frame is formed. Such a frame is shown in FIG. 3 which, for clearness' sake, does not show the diaphragm but shows a partial cutaway view of the frame 3 and of the intermediate frame 4.

Mechanical strength is ensured by dovetail joints 31 or 41 formed at the line of join between two contiguous components 30 or 40. Further, to provide a more uniform press effect and to improve sealing of the cell, the dovetails of one frame, 4, are shifted relative to the dovetails of the adjacent frames 3 and 3'.

Such frames can easily be assembled using identical components which are easy to manufacture using insulating materials of the elasto-plastic type. The dovetail joints provide good sealing once the frames are pressed together. An electrolyser consisting of such cells can then advantageously be placed in a pressurization chamber. This reduces the danger of leakage and the pressure stresses on the cells.

We claim:

1. In a filter-press type of electrolyser cell having a pair of electrodes, a diaphragm separating the pair of electrodes, and a pair of fluid-tight insulating frames, said diaphragm being sandwiched between said pair of fluid-tight insulating frames, the improvement wherein each of said fluid-tight frames comprises an assembly of a plurality of elongate components fitted together by interlocking joints.

2. An electrolyser cell according to claim 1, including an intermediate frame disposed around the periphery of the diaphragm and sandwiched between said fluid-tight insulating frames, wherein said intermediate frames comprise an assembly of a plurality of elongate components which are fitted together by interlocking joints.

3. A cell according to claim 1 or 2, wherein the interlocking joints between the elongate components of said frames are dovetail joints.

4. A cell according to claim 3, wherein the elongate components of said frames are made of an insulating elasto-plastic material.

5. A cell according to claim 1 or 2, wherein the lines of join of the elongate components of one frame are shifted with respect those of the frames adjacent thereto, whereby the interlocking joints of said one frame are sandwiched between unbroken surfaces of elongate components of the adjacent frames.

6. A cell according to claim 1 or 2, wherein said plurality of elongate components of each frame are identical to each other.

7. A cell according to claim 1 or 2, wherein the frames are substantially square in shape.

8. A cell according to claim 1 or 2, wherein the plurality of elongate components of each frame are fitted together end-to-end to form a closed annular frame, and each interlocking joint comprises an enlarged protrusion extending from an edge of an end portion of one elongate component interlocking with a mating recess in an edge of an end portion of the adjacent elongate component.

9. A cell according to claim 8 wherein each elongate component of each frame comprises one of said protrusions located at one end portion thereof and one of said recesses located at the opposite end portion thereof.

* * * * *

UNITED STATES PATENT AND TRADEMARK OFFICE
CERTIFICATE OF CORRECTION

PATENT NO. : 4,257,866
DATED : 24 March 1981
INVENTOR(S) : Pierre Belle et al.

It is certified that error appears in the above—identified patent and that said Letters Patent is hereby corrected as shown below:

Abstract, line 6: after "m$^2$)" delete ".".

Abstract, line 8: after "uses" insert --an--.

Column 1, line 31: delete in entirety.

Column 1, line 68: change "nvention" to --invention--.

Column 2, line 56: after "respect" insert --to--.

Signed and Sealed this

Seventh Day of July 1981

[SEAL]

Attest:

RENE D. TEGTMEYER

*Attesting Officer*   *Acting Commissioner of Patents and Trademarks*